US009182270B2

(12) United States Patent
Verheyen et al.

(10) Patent No.: US 9,182,270 B2
(45) Date of Patent: Nov. 10, 2015

(54) METHOD AND APPARATUS FOR MEASURING A LOAD IN A MATERIAL HANDLING SYSTEM

(75) Inventors: Kurtis L. Verheyen, Shorewood, WI (US); Gregory A. Byzewski, Milwaukee, WI (US)

(73) Assignee: Magnetek, Inc., Menomonee Falls, WI (US)

(*) Notice: Subject to any disclaimer, the term of this patent is extended or adjusted under 35 U.S.C. 154(b) by 807 days.

(21) Appl. No.: 13/470,785

(22) Filed: May 14, 2012

(65) Prior Publication Data
US 2013/0302113 A1 Nov. 14, 2013

(51) Int. Cl.
*H02P 7/00* (2006.01)
*H02P 3/00* (2006.01)
*G01G 19/18* (2006.01)
*H02P 1/04* (2006.01)
*H02P 1/16* (2006.01)
*G01G 9/00* (2006.01)

(52) U.S. Cl.
CPC .................. *G01G 19/18* (2013.01); *G01G 9/00* (2013.01); *H02P 1/04* (2013.01); *H02P 1/166* (2013.01)

(58) Field of Classification Search
CPC ............. H02P 1/04; H02P 1/166; G01G 9/00; G01G 19/18
USPC ................................................. 318/432, 476
See application file for complete search history.

(56) References Cited

U.S. PATENT DOCUMENTS

| | | | |
|---|---|---|---|
| 5,859,373 A | 1/1999 | Münzebrock et al. | |
| 6,527,130 B2 | 3/2003 | Ruddy | |
| 6,587,795 B2 | 7/2003 | Schmid | |
| 6,720,751 B2* | 4/2004 | Plasz et al. | 318/567 |
| 6,779,961 B2 | 8/2004 | Barney et al. | |
| 7,206,662 B2 | 4/2007 | Sparenborg et al. | |
| 7,234,684 B2 | 6/2007 | Kohlenberg et al. | |
| 7,353,959 B2* | 4/2008 | Zakula et al. | 212/278 |
| 7,545,116 B2 | 6/2009 | Nagata et al. | |
| 7,992,689 B2 | 8/2011 | Stolt et al. | |
| 2002/0039010 A1* | 4/2002 | Plasz et al. | 318/567 |
| 2008/0272725 A1* | 11/2008 | Bojrup et al. | 318/434 |
| 2012/0206074 A1* | 8/2012 | Kureck et al. | 318/400.15 |

OTHER PUBLICATIONS

Magnetek, IMPULSE•VG+ Series 3 Instruction Manual, Dec. 2010, p. 5-26.

* cited by examiner

*Primary Examiner* — Eduardo Colon Santana
*Assistant Examiner* — Gabriel Agared
(74) *Attorney, Agent, or Firm* — Boyle Fredrickson, S.C.

(57) ABSTRACT

A system and method for determining the load present in a material handling system is disclosed. A commissioning routine executing on a motor drive controls operation of a hoisting motor with a known load present. The commissioning routine stores values of current provided to the motor or torque generated by the motor at various operating speeds in memory on the motor drive. During subsequent runs of the motor drive, the value of the current/torque is monitored as a function of the speed of the motor and compared to the stored values. The resulting value of the load may be monitored and action taken if the value of the load exceeds the rated capacity of the material handling system. Optionally, the measured load may be displayed to an operator.

18 Claims, 6 Drawing Sheets

METHOD AND APPARATUS FOR MEASURING A LOAD IN A MATERIAL HANDLING SYSTEM

BACKGROUND OF THE INVENTION

The subject matter disclosed herein relates to measuring the load in a material handling system. More specifically, the subject matter disclosed herein relates to a method and apparatus for measuring the load in a material handling system using a motor drive controlling operation of the hoist motor.

Material handling systems are widely used to lift heavy loads, weighing up to hundreds of tons. A typical material handling system includes at least one motor used to raise and lower the load and at least one additional motor to position the material handling system over the load to be moved. Common applications include manufacturing facilities, in which large components may be positioned for assembly and/or the final assembly may be moved for shipping. Further, material handling systems are often required to handle loads of varying sizes. It is known that electric motors are capable of producing rated torque up to rated speed. Therefore, it may be desirable to verify that the weight of the load the system is attempting to move is less than or equal to the rated capacity of the system, such that the operator may safely raise/lower and position the load.

It is known that this weight measurement may be performed by the addition of an external weighing device, such as a load cell. However, external weighing devices have not been realized without certain disadvantages. External weighing devices add expense in both material and commissioning costs. The load cell is typically mounted to a mechanical component of the material handling system that is subject to a degree of strain or deflection as a result of lifting the load. Consequently, the load cell may need to be mounted on the hook or another movable member of the material handling system. The feedback signal from the load cell must then be wired or wirelessly communicated to a controller. The feedback signal may also need calibration to the load.

As is understood in the art, weighing devices measure forces applied to the device. The force applied as a result of gravity acting on the load corresponds to the weight of the object; however, in a material handling system, other forces are similarly applied to the weighing device. For example, the torque required to accelerate a load when raising the load or to decelerate a load when lowering the load provides an additive force on the weighing device. Similarly, deceleration when raising or acceleration when lowering is assisted by gravity, resulting in a reduced weight being measured by the weighing device. In order to obtain an accurate measurement of the weight of the load, therefore, the motor either raises and suspends the load at zero speed or operates for a short period at a constant speed when measuring the load.

Other systems have been introduced to obtain a measurement of the load as a function of the current provided to the motor. However, these systems have similarly not been realized without certain disadvantages. Although the current provided to the motor is a function of the weight of the load, the current is also a function of the torque applied to the load. Therefore, the magnitude of the current also varies during acceleration or deceleration of the motor. Consequently, current measurement systems may also require the motor to either raise and suspend the load at zero speed or operate for a short period at a constant speed when measuring the load. As a result of the limitations on obtaining accurate measurements, systems that employ either a load cell or current measurement may perform an initial test of the weight of the load, but make no further checks as a load is raised or lowered.

However, in some applications, the weight of the load may vary during as the load is raised or lowered. In some instances, the variation in weight may be unexpected. For example, in the shipping industry, containers are loaded and unloaded between storage facilities, trucks, trains, and ships. The containers are often stacked several layers high and in close proximity to each other or to walls, for example, within a hold of a ship. As the container is raised or lowered, it may sway, for example, due to the wind, or the other containers may move, for example, as the deck of a ship moves. In either instance, the container may contact or become snagged on an adjacent container, causing a change in the weight of the load. In other instances, the variation in weight is part of the application requirements. For example, bulk materials such as sand or salt may require a bucket, or clam shell, attachment. The clam-shell is lowered in an open position and closed to scoop up a load of the bulk material. As the operator begins to raise the clam-shell, there may be some initial slack in the cable. The weight of the load may be significantly lower or even near zero during the period at which the load is measured. The load may, therefore, be initially determined as safe but may subsequently exceed the rated capacity of the material handling system.

Thus, it is desirable to provide a system configured to periodically monitor the weight of the load throughout a run without requiring external load measurement devices.

BRIEF DESCRIPTION OF THE INVENTION

The subject matter disclosed herein describes a system and method for determining the load present in a material handling system. A commissioning routine executing on a motor drive controls operation of a hoisting motor with a known load present. The commissioning routine stores values of current provided to the motor or torque generated by the motor at various operating speeds in memory on the motor drive. During subsequent runs of the motor drive, the value of the current/torque is monitored as a function of the speed of the motor and compared to the stored values. The resulting value of the load may be monitored and action taken if the value of the load exceeds the rated capacity of the material handling system. Optionally, the measured load may be displayed to an operator.

According to one embodiment of the invention, a method of detecting a magnitude of a load applied to a motor in a material handling system using a motor drive controlling the motor is disclosed. The method includes initial steps performed during a commissioning run of generating a table containing a plurality of values of a first signal internal to the motor drive corresponding to the load applied to the motor at a plurality of speeds of the motor and storing the table in a memory device in the motor drive. During subsequent runs, the method includes the steps of reading a value of the first signal internal to the motor drive corresponding to the load applied to the motor, reading a value of a second signal internal to the motor drive corresponding to the speed of the motor, reading a stored value of the first signal from the table, the stored value corresponding to the speed of the motor during the present run as indicated by the second signal, and comparing the value of the first signal during the present run to the stored value of the first signal.

According to another aspect of the invention, the method may include the steps of reading a scaling parameter from the memory device, determining a magnitude of the load as a function of the first signal and of the scaling parameter, and providing a visual indication of the magnitude of the load to an operator of the motor drive. Optionally, the method may read a configuration parameter from the memory device and if the value of the first signal during the present run is greater than or equal to the stored value of the first signal, control operation of the motor as a function of the configuration parameter, but if the value of the first signal during the present run is less than the stored value of the first signal, continue the present run.

According to still another aspect of the invention, the rated load of the material handling system is applied during the commissioning run, and the commissioning run may further include the steps of suspending the rated load from the material handling system, accelerating the motor from zero speed to rated speed in a first direction of rotation, storing the values of the first signal at a plurality of speeds of the motor as the motor accelerate between zero speed and rated speed, and decelerating the motor from rated speed to zero speed. The commissioning run may further include the steps of accelerating the motor from zero speed to rated speed in a second direction of rotation, the second direction opposite to the first direction, storing the values of the first signal at a plurality of speeds of the motor as the motor accelerate between zero speed and rated speed, and decelerating the motor from rated speed to zero speed.

According to yet other aspects of the invention, the first signal corresponds to the magnitude of the current supplied from the motor drive to the motor. Optionally, the first signal may correspond to the magnitude of the torque generated by the motor. The second signal may be either a speed reference signal or an internally generated speed feedback signal. A position feedback device may be connected to the motor and configured to generate a speed feedback signal corresponding to the rotation of the motor, and the second signal may be generated from the speed feedback signal.

According to another embodiment of the invention, a motor drive is configured to control a hoisting motor in a material handling system. The motor drive includes a plurality of power terminals configured to receive one of alternating current (AC) or direct current (DC) input power from an external power source, and a power conversion section configured to transfer the input power to output power to the hoisting motor. The output power includes at least one of a controlled current and a controlled voltage. the motor drive also includes at least one input terminal configured to receive a command signal corresponding to a desired speed of the motor, at least one current sensor configured to generate a signal corresponding to an amplitude of the current output to the motor, a memory device configured to store a plurality of instructions and a plurality of parameters, and a processor. The processor is configured to execute the plurality of instructions to determine the value of a load present on the motor as a function of the amplitude of the current output to the motor; during a commissioning run, generate a table including a plurality of values of the load present on the motor at a plurality of speeds of the motor; store the table in the memory device; and during subsequent runs, compare the value of the load present on the motor to a stored value of the load at a speed corresponding to the present speed of the motor.

According to another aspect of the invention, the motor drive includes a display configured to provide a visual indication of the magnitude of the load to an operator of the motor drive. Optionally, the processor is further configured to read a configuration parameter from the memory device, and if the value of the load during the present run is greater than or equal to the stored value of the load, control operation of the motor as a function of the configuration parameter, but if the value of the load during the present run is less than the stored value of the load, continue the present run.

According to still another aspect of the invention, the table is generated with the rated load of the hoisting motor present. In order to generate the table, the program may be further configured to suspend the rated load from the hoisting motor, accelerate the hoisting motor from zero speed to rated speed in a first direction of rotation, store values of the load determined as a function of the amplitude of the controlled current output to the motor at a plurality of operating speeds between zero speed and rated speed, and decelerate the hoisting motor from rated speed to zero speed. The program may be further configured to accelerate the hoisting motor from zero speed to rated speed in a second direction of rotation, the second direction opposite to the first direction, store values of the load determined as a function of the amplitude of the controlled current output to the motor at a plurality of operating speeds between zero speed and rated speed, and decelerate the hoisting motor from rated speed to zero speed.

According to yet another aspect of the invention, the motor drive includes an input configured to receive a signal from a position sensor operatively mounted on the hoisting motor. The signal corresponds to the angular position of the hoisting motor, and the processor is further configured to execute to determine the speed of the motor as a function of the rate of change of the signal from the position sensor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
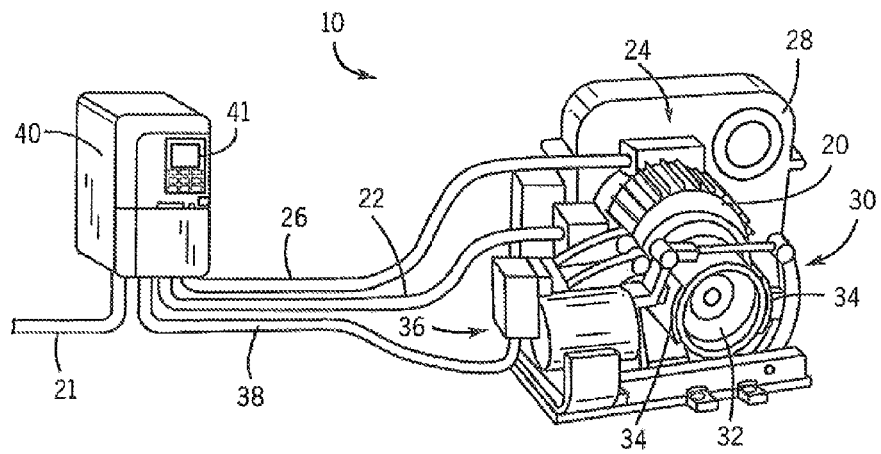
FIG. 1 is a schematic representation of an exemplary embodiment incorporating the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 2:
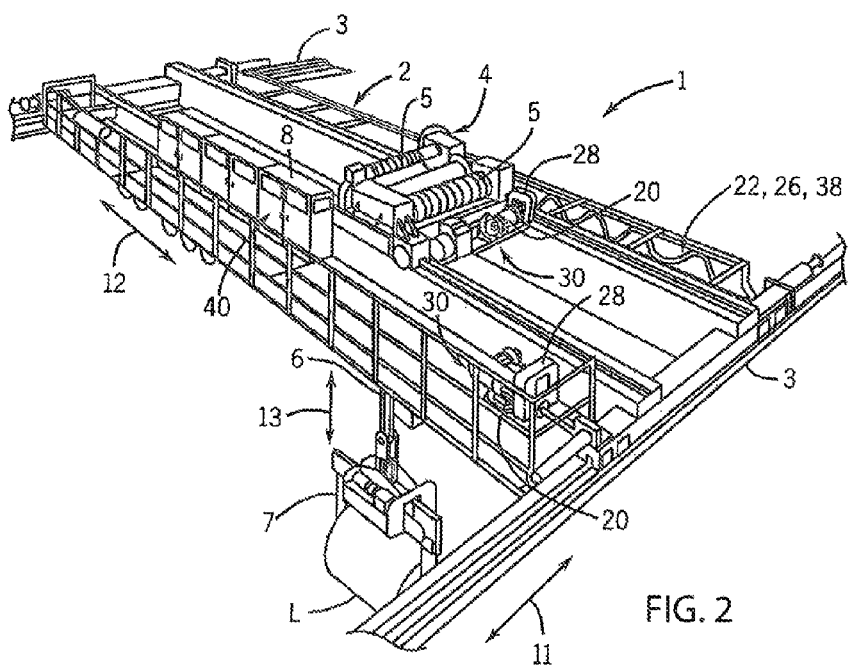
FIG. 2 is an exemplary environment incorporating the exemplary embodiment of FIG. 1.

Turning initially to FIG. 2, an exemplary embodiment of a material handling system 1 incorporating the present invention is illustrated. It is contemplated that the material handling system 1 may have numerous configurations according to the application requirements. According to one embodiment, the material handling system 1 may include a bridge 2 configured to move in a first axis of motion 11 along a pair of rails 3 located at either end of the bridge 2. A trolley 4 may be mounted on the bridge 2 to move in a second axis of motion 12, generally perpendicular to the first axis of motion 11, along the length of the bridge 2. One or more sheaves 5, also referred to as drums, may be mounted to the trolley 4, around which a cable 6 is wound. The sheave 5 may be rotated in either direction to wind or unwind the cable 6 around the sheave 5. The cable 6 is operatively connected to a hook block or any other lifting fixture 7 such that the hook block may be connected to a load, L, and move in a third axis of motion 13, generally perpendicular to each of the first and the second axes of motions, 11 and 12. One or more control cabinets 8 housing, for example, the motor controller 40 are mounted on the bridge 2.

Referring next to FIG. 1, an exemplary portion of the drive system 10 for one axis of motion in the material handling system 1 is illustrated. The exemplary portion of the drive system 10 includes a motor 20 controlled by a motor controller 40, also referred to herein as a motor drive. The motor controller 40 delivers a regulated voltage and/or current to the motor 20 via a set of electrical conductors 22. The magnitude and/or frequency of the voltage or current may be varied to control the speed at which the motor 20 rotates, the torque produced by the motor 20, or a combination thereof. A feedback device 24, such as an encoder or a resolver, is connected to the motor, typically by mounting the feedback device 24 to the output shaft at one end of the motor 20. The feedback device 24 provides to the motor controller 40, via electrical conductors 26, any suitable electrical signal, corresponding to rotation of the motor 20, as would be known in the art. A gearbox 28 may be connected to the output shaft of the motor 20 for rotating any suitable drive member at a desired speed according to the requirements of the axis of motion to which the gearbox 28 is connected. Optionally, the motor 20 may be configured to directly rotate the drive member.

A braking unit 30 is supplied to prevent undesired rotation of the motor 20. As illustrated in FIG. 1, one embodiment of the braking unit 30 includes a brake wheel 32 mounted to a shaft extending from the motor 20. Brake shoes 34 engage opposite sides of the brake wheel 32. A brake controller 36 selectively engages and disengages the brake shoes 34 to the brake wheel 32. The brake controller 36 may be, but is not limited to, an electric or a hydraulic controller receiving a command signal from the motor controller 40 via an electrical conductor 38. Optionally, the braking unit 30 may include, for example, a disc attached to the motor and employee brake pads to engage the disc. It is contemplated that numerous other configurations of brakes may be employed without deviating from the scope of the present invention. According to still other embodiments, the braking unit 30 may be connected at any suitable location along the drive system 10 to prevent motion of the commanded axis according to application requirements.

The exemplary embodiment of a material handling system 1 is not intended to be limiting. The present invention may be incorporated into material handling systems utilizing other load handling members, including but not limited to overhead material handling systems incorporating a block and hook, a bucket, a clam-shell attachment, or a magnet. Similarly, the present invention may be incorporated into winch-type applications which may spool out and reel in a cable along a more horizontal plane, including but not limited to a winch, a dredge, an anchor, or other side-pull systems The following definitions will be used to describe exemplary material handling systems throughout this specification. As used herein, the terms "raise" and "lower" are intended to denote the operations of letting out or reeling in a cable 6 connectable to a load handling member 7 of a material handling system 1 and are not limited to moving a load, L, in a vertical plane. The load handling member 7 may be any suitable device for connecting to or grabbing a load, including, but not limited to, a hook block, a bucket, a clam-shell, a grapple, or a magnet. While an overhead crane may lift a load vertically, a winch may pull a load from the side. Further, an appropriately configured load handling member 7 may allow a load to unwind cable or may reel in the load by winding up the cable at any desired angle between a horizontal plane and a vertical plane.

The "cable," also known as a "rope," may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor controller 40. The motor controller 40 controls operation of the motor 20, rotating the motor 20 to cause the cable 6 to wind around or unwind from the sheave 5. A "run" may include multiple starts and stops of the motor 20 and, similarly it may require multiple "runs" to let the cable 6 fully unwind or wind completely around the sheave 5. Further, the cable 6 need not be fully unwound from or wound around the sheave 5 before reversing direction of rotation of the motor 20. In addition, direction of rotation of the motor 20 may be reversed within a single run.

Figure 3:
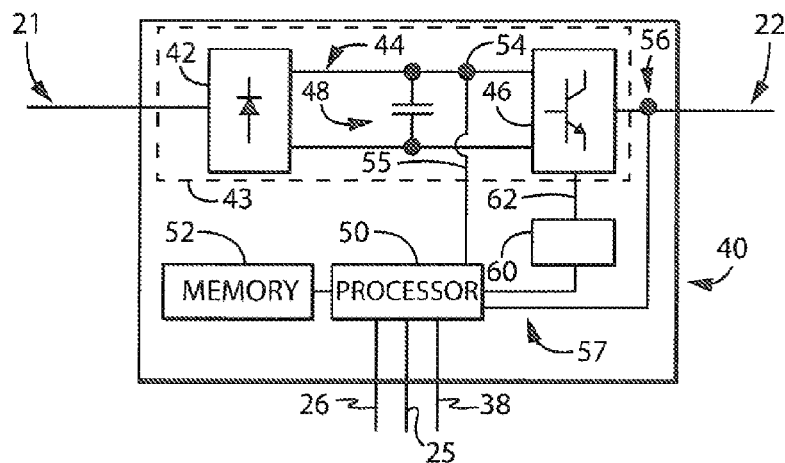
FIG. 3 is a block diagram of a motor controller for the exemplary embodiment of FIG. 1.

Referring next to FIG. 3, the motor controller 40 receives a command signal 25 from any suitable operator interface. The operator interface may be, but is not limited to, a keypad 41 mounted on the motor controller 40, a remote industrial joystick with a wired connection to the motor controller 40, or a radio receiver connected to the motor controller receiving a wireless signal from a corresponding radio transmitter. The motor controller 40 includes an input 21, for example, one or more terminals, configured to receive power, which may be a single or multiple phase alternating current (AC) or a direct current (DC) power source. A power conversion section 43 of the motor controller 40 converts the input power 21 to a desired power at an output 22 configured to connect to the motor 20. The output 22 may similarly be a single or multiple phase AC or a DC output, according to the application requirements. According to the illustrated embodiment, the power conversion section 43 includes a rectifier section 42 and an inverter section 46, converting a fixed AC input to a variable amplitude and variable frequency AC output. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The input power 21 is converted to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor controller 40. An inverter section 46 converts the DC voltage on the DC bus 44 to the desired output power 22 for the motor 20 according to switching signals 62.

Figure 4:
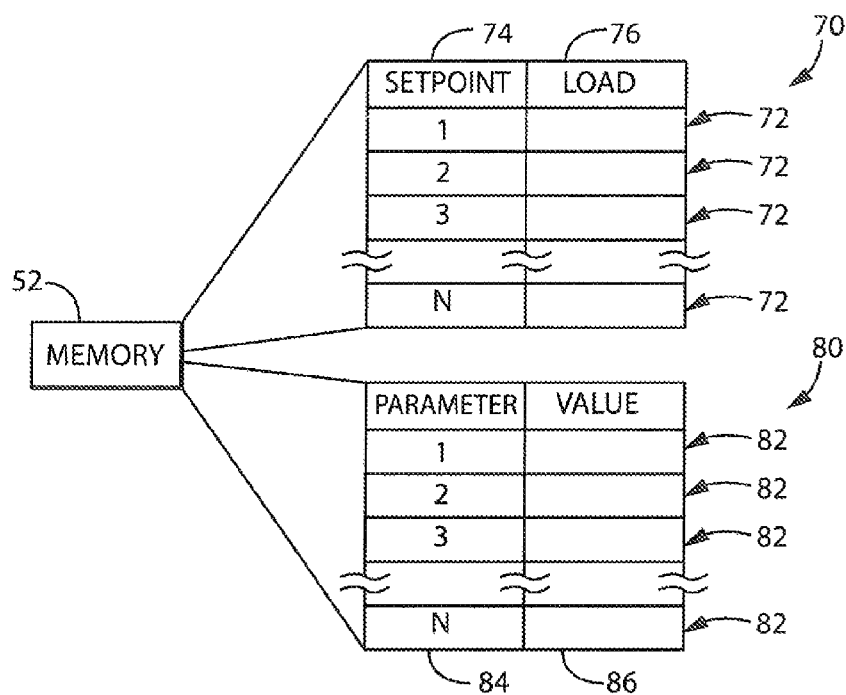
FIG. 4 is a block diagram representation of a portion of the data stored in the memory device of the motor controller of FIG. 3.
Figure 5:
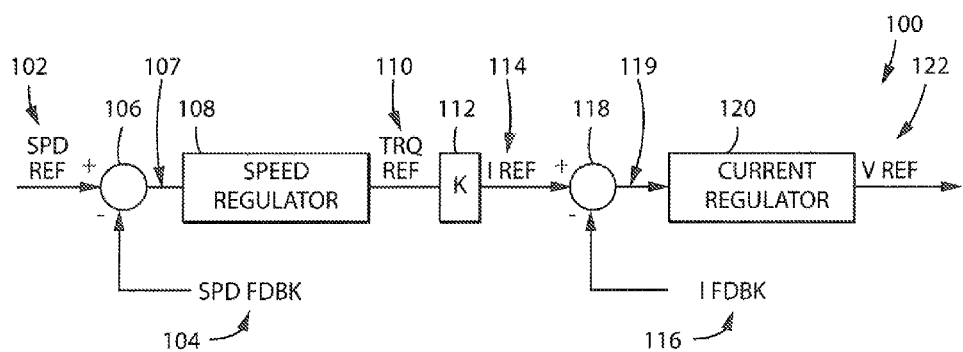
FIG. 5 is a block diagram representation of a motor control module executing in the processor of FIG. 3.

The motor controller 40 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, or a combination thereof. The memory device 52 preferably stores parameters 82 of the motor controller 40 and one or more programs, which include instructions executable on the processor 50. Referring also to FIG. 4, a parameter table 80 includes an identifier 84 and a value 86 for each of the parameters 82. The parameters 82 may, for example, configure operation of the motor controller 40 or store data for later use by the motor controller 40. Referring also to FIG. 5, the processor 50 is configured to execute a motor control module 100 to generate a voltage reference 122 to the motor 20 corresponding to the necessary amplitude and frequency to run the motor 20 and the desired speed reference 102. The motor 20 may include a position sensor 24 connected to the motor controller 40 via an electrical connection 26 to provide a position feedback signal corresponding to the angular position of the motor 20. The processor 50 determines a speed feedback signal 104 as a function of the rate of change of the position feedback signal over time. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor controller 40, respectively. The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

In operation, the processor 50 receives a command signal 25 indicating a desired operation of the corresponding motor 20 in the material handling system 1 and provides a variable amplitude and frequency output voltage 22 to the motor 20 responsive to the command signal 25. The command signal 25 is received by the processor 50 and converted, for example, from discrete digital signals or an analog signal to an appropriately scaled speed reference 102 for use by the motor control module 100. If closed loop operation of the motor drive 40 is desired, where closed loop operation includes a speed feedback signal 104, the speed reference 102 and the speed feedback signal 104 enter a summing junction 106, resulting in a speed error signal 107. The speed feedback signal 104 may be derived from a position feedback signal generated by the position sensor 24. Optionally, the speed feedback signal 104 may be derived from an internally determined position signal generated, for example, by a position observer. The speed error signal 107 is provided as an input to a speed regulator 108. The speed regulator 108, in turn, determines the required torque reference 110 to minimize the speed error signal 107, thereby causing the motor 20 to run at the desired speed reference 102. If open loop operation of the motor drive 40 is desired, where open loop operation does not include a speed feedback signal, the speed reference signal 102 may be scaled directly to a torque reference 110 that would result in the motor 20 operating at the desired speed reference 102. A scaling factor 112 converts the torque reference 110 to a desired current reference 114. The current reference 114 and a current feedback signal 116, derived from a feedback signal 57 measuring the current present at the output 22 of the motor drive 40, enter a second summing junction 118, resulting in a current error signal 119. The current error signal is provided as an input to the current regulator 120. The current regulator 120 generates the voltage reference 122 which will minimize the error signal 119, again causing the motor 20 to run at the desired speed reference 102. This voltage reference 122 is used to generate the switching signals 62 which control the inverter section 46 to produce a variable amplitude and frequency output voltage 22 to the motor 20.

Figure 6:
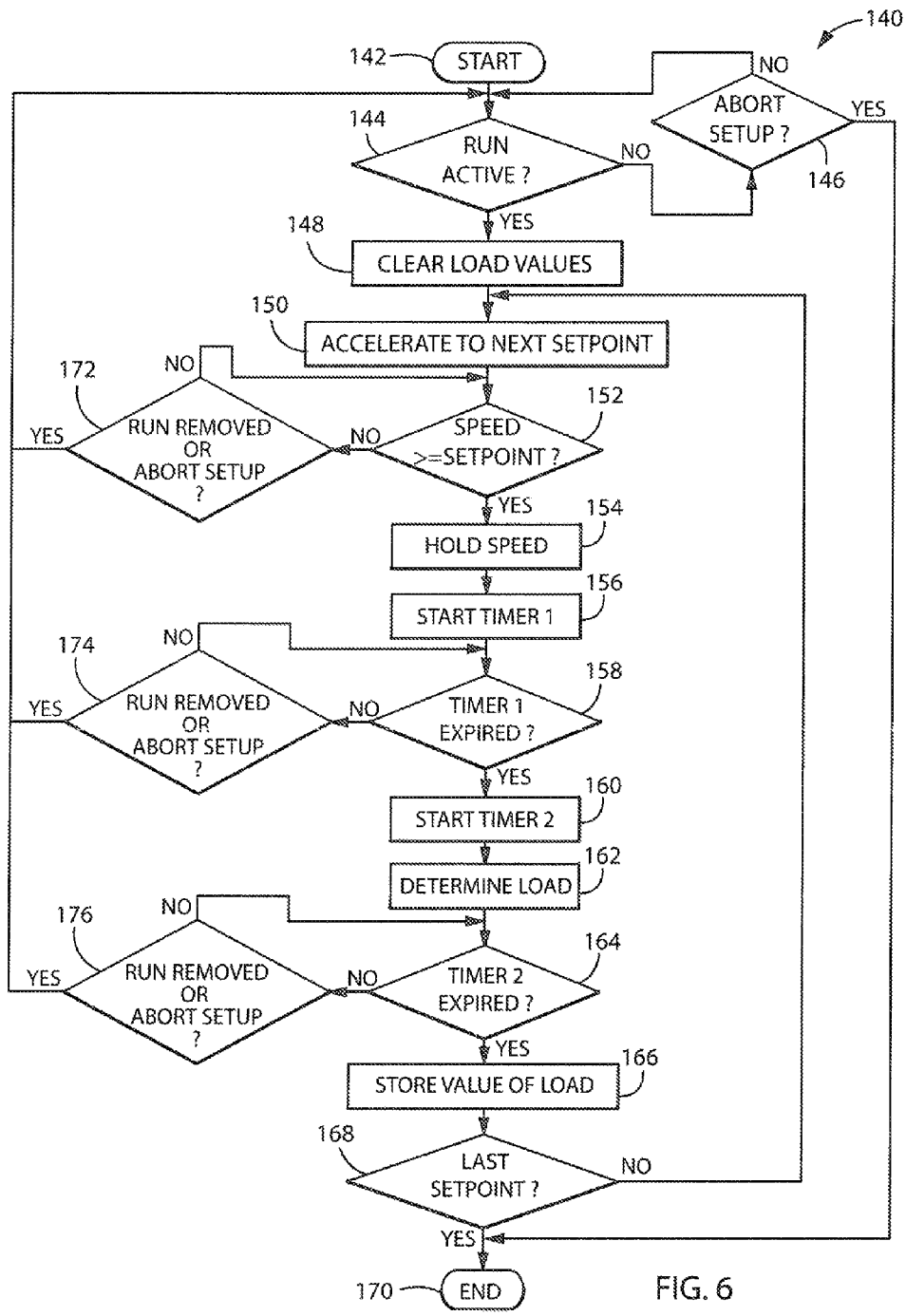
FIG. 6 is a flow diagram illustrating the steps for commissioning the load measurement system.

In order to facilitate setup of load measurement system in the material handling system 1, a commissioning module 140 is stored in the memory 52 for execution by the processor 50 of the motor controller 40. The steps of a commissioning run performed by the commissioning module 140 are illustrated in FIG. 6. The commissioning run is configured to generate a table 70, as shown in FIG. 4, containing entries for various setpoints 72. Each setpoint 72 includes at least an identifier 74 and a stored value 76. Optionally, the setpoints 72 may be stored as parameters 82 and the parameter table 80 and the setpoint table 70 may be a single table. Initially, each stored value 76 may be set to a default value, such as zero or another predefined value. Each setpoint 72 corresponds to a desired operating speed of the motor 20 at which the load is measured. According to one embodiment of the invention, each of the setpoints 72 corresponds to a predefined range of speeds of the motor 20, for example, 0-4 Hz or 4-8 Hz. Optionally, each of the setpoints 72 corresponds to a specific operating speed of the motor 20 for example, 4 Hz or 8 Hz. As still another option, each setpoint 72 may include another column in the table 70 such that the desired operating speed is configurable and stored in the table 70. Prior to initiating the commissioning run, a known load is connected to the material handling system 1. According to one embodiment of the invention, the known load is equal to the rated load of the material handling system 1 or of the hoisting motor to be commissioned. The operator may manually raise the load a small amount, suspending the load from the hook or other lifting fixture 7.

The commissioning run begins at step 142 and is initiated by an operator. The commissioning run may be performed on initial start up of the material handling system 1 or after maintenance is performed that may impact the load measurement system. The operator initiates the commissioning run, for example, by setting a parameter 82 in the motor controller 40 indicating a commissioning run is to be performed and pressing a start button. Alternately, an input terminal may be configured to receive a start command. At step 144, the commissioning module 140 determines whether the run command has been received. If not, the commissioning module 140 loops back via step 146 waiting for the run command to be activated. If prior to the run command being activated, an abort setup command is received, step 146 will transfer execution to step 170, terminating the commissioning module 140. Once the run command is active, previously stored load values are cleared, as illustrated in step 148, and the motor controller 40 is commanded to accelerate to the next setpoint 72, per step 150. The commissioning module 140 then loops back via step 172 waiting for the speed of the motor 20 to reach the next setpoint 72 as long as the setup is not aborted. If prior to the motor 20 reaching the next setpoint 72, either the run command is removed or an abort setup command is received, step 172 will transfer execution back to the top of the commissioning module 140, below step 142. If the run command was removed, execution of the commissioning module 140 may be restarted, but if the abort setup command was received, steps 144 and 146 will transfer execution to step 170, terminating the commissioning module 140.

Upon reaching the next setpoint 72 at step 152, the commissioning module 140 commands the motor 20 to maintain operation at the speed associated with that setpoint 72, as shown in step 154. Steps 156 and 158 start a first timer that loops back via step 174. The first timer permits the current in the motor 20 to stabilize subsequent to an acceleration or deceleration to the next setpoint 72. Step 174 permits the commissioning module 140 to be paused and/or terminated in the same manner as step 172, previously discussed. Upon expiration of the first timer, steps 160 and 164 start a second timer that loops back via step 176. During execution of the second timer, the value of the load is determined at step 162. Obtaining multiple values of the load during execution of the second timer allows those values to be averaged or otherwise filtered to provide an accurate measurement of the load. Step 176 permits the commissioning module 140 to be paused and/or terminated in the same manner as step 172, previously discussed. Upon expiration of the second timer, the value of the load 76 is stored in the table 70 for the corresponding setpoint 72, as shown in step 166. At step 168, the commissioning module 140 determines whether this was the final setpoint 72 in the table 70. If additional load values need to be determined, the commissioning module 140 loops back above step 150, accelerates the speed of the motor 20 to the next setpoint, and repeats the steps in the commissioning module 140 for the next setpoint 72. If the load has been measured for the last setpoint 72, the commissioning module 140 ends, step 170, and the commissioning run is complete.

According to one embodiment of the invention, the commissioning run executes from zero speed up to rated speed of the motor 20, and the setpoints are selected at substantially uniform intervals across the speed range. Optionally, the setpoints may be selected at non-uniform intervals according to the operating characteristics of the motor. For example, certain ranges of operating speeds have non-uniform torque characteristics. According to one embodiment of the invention, the intervals between setpoints at each of the low and high ends of the operating ranges may be smaller than the intervals at the middle of the operating range. For example, the intervals from 0-6 Hz or 55-60 Hz may be equal to or less than one hertz while the intervals from 6-55 Hz may be an order of magnitude greater. Although illustrated in FIG. 6 as being performed in a single direction, separate commissioning runs may be executed in both directions with values for both runs being stored in the table 70. It is further contemplated that one or more additional commissioning runs may be performed with varying known weights, including, but not limited to, a no load operating condition or 50% of rated load. Determination of the measured load could use the present value of a commanded current or torque, for example, and interpolate between the stored values to obtain the value of the measured load.

Figure 7:
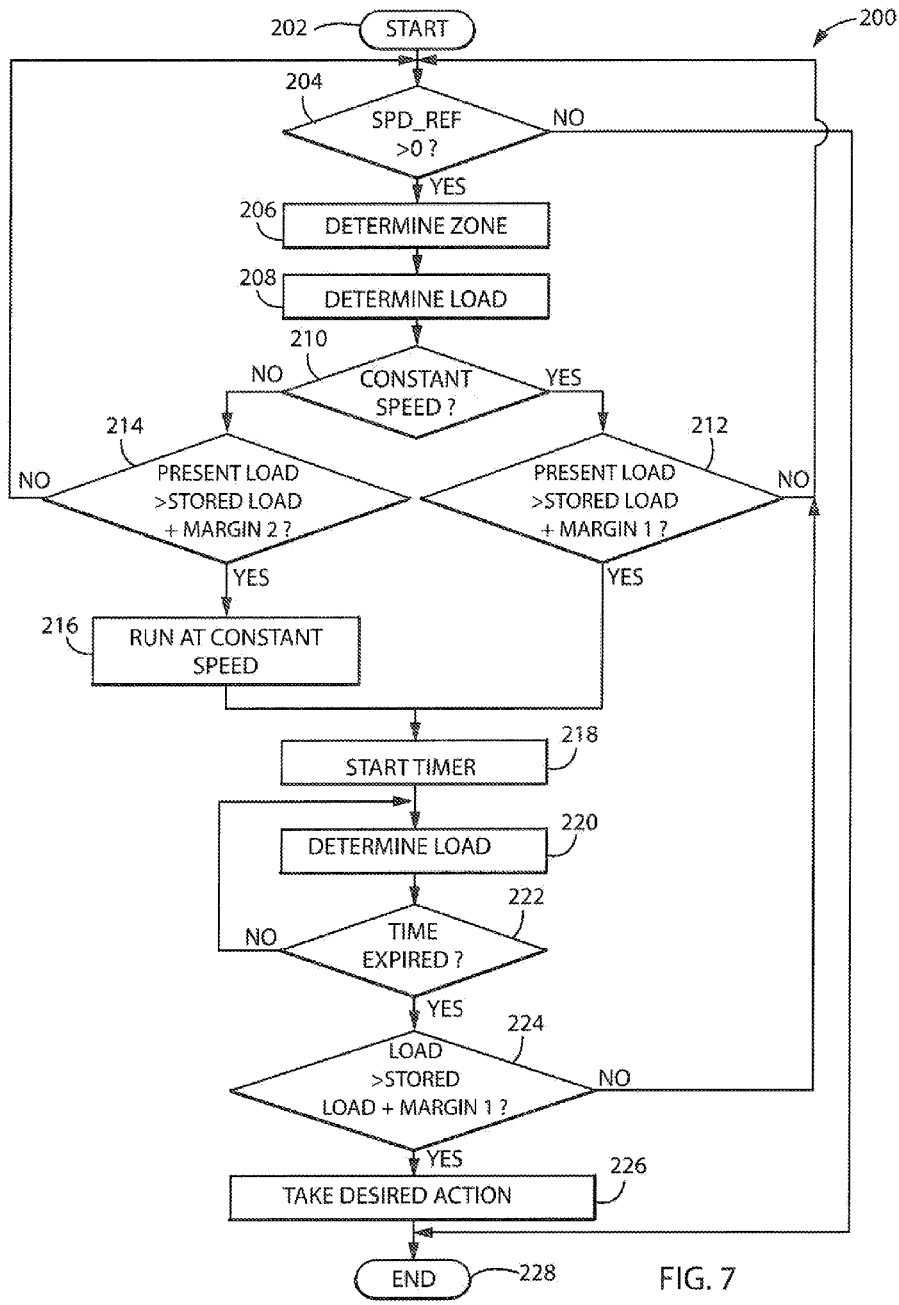
FIG. 7 is a flow diagram illustrating the steps for executing the load measurement system and taking action responsive to excessive load being present.

Having completed a commissioning run, the table 70 contains values of the load measured at the varying operating speeds of the motor 20 for a known load. During subsequent runs of the motor 20, the processor may monitor the measured value of the load at the various operating speeds and compare the measured value of the load present on that run to the previously measured value for a known load. Measuring the value of the load is performed by steps of a monitoring module 200 stored in the memory 52 for execution by the processor 50 of the motor controller 40. These steps performed by the monitoring module 200 are illustrated in FIG. 7.

The monitoring module 200 begins at step 202 and monitors the load present when a run is commanded on the hoisting motor. At step 204, the monitoring module 200 waits for the speed reference 102 to be greater than zero. While the speed reference is zero, the monitoring module 200 transfers execution to the end, step 228, of the module 200. When the speed reference is greater than zero, the monitoring module 200 continues execution at step 206 by determining in which zone, or range of speeds, the motor 20 is presently being commanded to operate. The operating zone corresponds to the speed setpoints 72 defined in the commissioning module 140. If the setpoints 72 defined ranges of speeds, the zone corresponds directly to the setpoints 72. If the setpoints 72 defined specific operating speeds, the zone corresponds to a range of speeds bounded by the setpoints 72 below and above the current operating speed. At step 208, the monitoring module 200 determines the value of the load present.

The monitoring module 200 next determines, at step 210, whether the speed reference 102 is a constant value or changing, for example, due to acceleration or deceleration. If the speed reference 102 is constant, the monitoring module 200 compares the measured load during the present run to the value of the load stored in the table 70 during the commissioning run for the same zone at step 212. The monitoring module 200 uses a first margin read, for example, from a parameter 82 which defines an acceptable level of deviation from the stored value. If the measured load during the present run is less than the stored value of the load plus the acceptable level of deviation, execution of the monitoring module 200 returns to the beginning and again checks that the speed reference 102 is greater than zero at step 204. If the measured load during the present run is greater than the stored value of the load plus the acceptable level of deviation, execution of the monitoring module 200 is transferred to step 218.

If at step 210 the speed reference 102 was changing, the monitoring module 200 compares the measured load during the present run to the value of the load stored in the table 70 during the commissioning run for the same zone at step 214. The monitoring module 200 uses a second margin read, for example, from a parameter 82 which defines an acceptable level of deviation from the stored value and multiplies the stored load measurement against the second margin. Because the speed reference is changing, the second margin is greater than the first margin, allowing comparison of the measured load against the stored value of the load to occur during acceleration or deceleration of the motor. If the measured load during the present run is less than the stored value of the load plus the acceptable level of deviation, execution of the monitoring module 200 returns to the beginning and again checks that the speed reference 102 is greater than zero at step 204, determines in which zone the motor 20 is presently being commanded to operate, and repeats steps 208 to 214 as appropriate. If the measured load during the present run is greater than the stored value of the load plus the acceptable level of deviation, the monitoring module 200 commands the motor 20 to begin running at a constant speed at step 216 to facilitate a more accurate measurement of the load. Execution of the monitoring module 200 is again transferred to step 218.

Steps 218 and 222 execute a timer, during which the value of the load is determined as shown at step 220. Obtaining multiple values of the load during execution of the second timer allows those values to be averaged or otherwise filtered to provide an accurate measurement of the load. Upon expiration of the timer, the measured value of the load is compared to the value of the load stored in the table 70 during the commissioning run for the same zone plus the acceptable level of deviation defined by the first margin. If the load measured during execution of the timer is less than the stored value of the load plus the acceptable level of deviation, execution of the monitoring module 200 returns to the beginning and again checks that the speed reference 102 is greater than zero and repeats the above-defined steps. If the measured load during the present run is greater than the stored value of the load plus the acceptable level of deviation, the monitoring module 200 takes a desired action at step 226. It is contemplated that a configuration parameter 82 may include multiple settings defining the desired action, including, but not limited to, generating an alarm message and continuing operation, decelerating the motor 20 to a stop, allowing the motor 20 to coast to a stop, and commanding the braking unit 30 to immediately have the brake shoes 34 engage the brake wheel 32, stopping rotation of the motor 20.

According to another embodiment of the invention, the motor controller 40 provides an indication, either audio or visual, of the measured load to the operator. The value of the measured load may be displayed, for example, on the keypad 41 of the motor controller 40. Optionally, a display unit remote from the motor controller may be mounted such that the operator may observe the measured load, for example, from a cab or from the ground. Still other indicators may be provided to alert the operator that the load being lifted exceeds the stored value of the load, including, but not limited to, a horn, buzzer, or other audio alarm, and/or a solid or flashing lamp.

Figure 8:
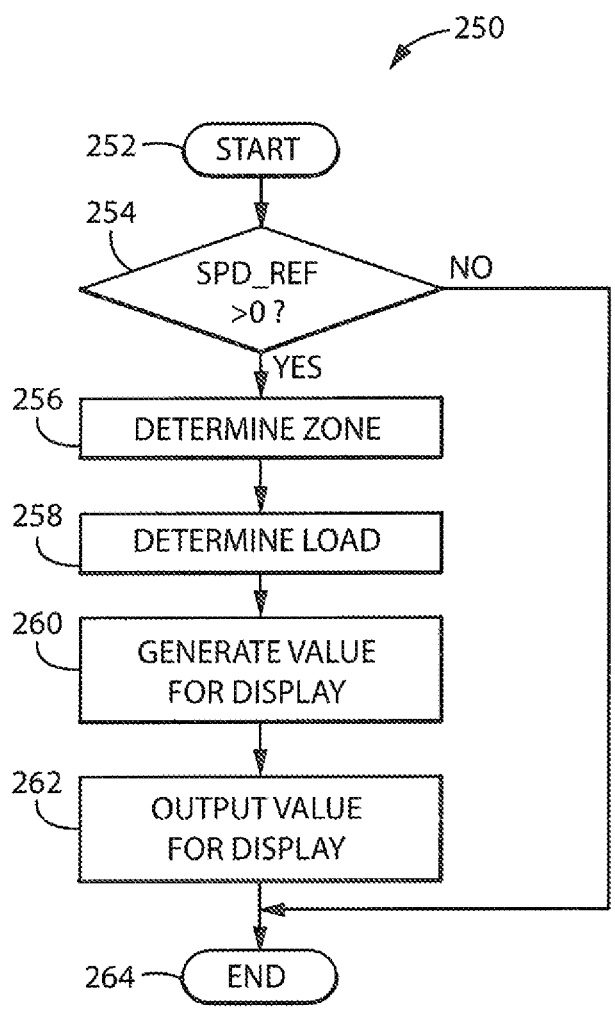
FIG. 8 is a flow diagram illustrating the steps for executing the load measurement system and displaying the measured load.

Referring next to FIG. 8, the steps of a load measurement display module 250 are illustrated. The measurement display module 250 starts at step 252 and, at step 254, determined whether the speed reference 102 is greater than zero. While the speed reference is zero, the load measurement display module 250 transfers execution to the end, step 264, of the module 250. When the speed reference is greater than zero, the load measurement display module 250 continues execution at step 256 by determining in which zone, or range of speeds, the motor 20 is presently being commanded to operate. The load measurement display module 250 next determines the value of the load during the present run, as shown at step 258. According to one embodiment of the invention, the material handling system 1 includes only an audio or visual indicator to indicate the presence of a load exceeding the rated load, the load determination of step 258 may proceed in the same manner as previously described for steps 210-228 of the monitoring module 200. The generated value for display, step 260, is a binary signal either activating or deactivating the audio or visual indicator and, at step 262, the audio or visual indicator is turned on or off accordingly. According to another embodiment of the invention, the material handling system 1 includes a display showing the measured load in physical units, such as such as pounds (lbs) or kilograms (kgs). In this embodiment, the commissioning module 140 shown in FIG. 6 is run at least a first time with a rated load and a second time with no load present on the lifting fixture 7. The load determination of step 258 determines the value of the present load and interpolates between the pair of stored values of the load for the corresponding speed and determines the present value of the load present as a percentage of the rated load. A scaling parameter 82 may be read from memory 52 to convert the measured load value from the percentage value of rated current or torque or any other internal units to a unit of weight. At steps 260 and 262, the measured load value is multiplied by the scaling factor and transmitted to the display unit. The load measurement display module 250 ends, step 264, upon displaying the measured load value, but is repeated at a periodic interval to continually calculate and update the display of the measured load value.

Referring to FIG. 5, it is contemplated that the value of the load may be determined from any of the signals internal to the motor controller 40 that correspond to the load. For example, the torque reference 110, current reference 114, and current feedback 116 each change as a function of the load. However, each of these signals is impacted by factors in addition to the load such as inefficiencies in the motor 20 or gearbox 2. In a hoisting motor on a material handling system, gravity further impacts each direction, assisting acceleration in the down direction and deceleration in the up direction while opposing acceleration in the up direction and deceleration in the down direction. Further, the weight of the ropes may be substantial and variable over the course of a run as they are wound on and off of the sheave 5. By executing a commissioning run on the material handling system 1, many of these variables are accounted for within the load value stored in the table 70. Further, by providing a first margin about the stored value during constant speed operation and a second margin during acceleration or deceleration, the motor controller 40 can continually monitor the load over the course of the entire run rather than only during constant speed operation.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of detecting a magnitude of a load applied to a motor in a material handling system using a motor drive controlling the motor, the method comprising the steps of:

during a commissioning run:
suspending a known load from the material handling system, accelerating the motor from a first speed to a second speed in a first direction of rotation, wherein the second speed is greater than the first speed,
generating a table containing a plurality of values of a first signal internal to the motor drive, wherein the first signal is a function of the known load and wherein the table is generated by storing the value of the first signal at a plurality of speeds of the motor as the motor accelerates between the first speed and the second speed: and
storing the table in a memory device in the motor drive;

during subsequent runs, reading a value of the first signal internal to the motor drive corresponding to the load applied to the motor;

reading a value of a second signal internal to the motor drive corresponding to the speed of the motor;

reading a stored value of the first signal from the table, the stored value corresponding to the speed of the motor during the present run as indicated by the second signal; and comparing the value of the first signal during the present run to the stored value of the first signal.

2. The method of claim 1 further comprising the steps of:
reading a scaling parameter from the memory device;
determining a magnitude of the load as a function of the first signal and of the scaling parameter; and
providing a visual indication of the magnitude of the load to an operator of the motor drive.

3. The method of claim 1 further comprising the steps of:
reading a configuration parameter from the memory device; and
if the value of the first signal during the present run is greater than or equal to the stored value of the first signal, control operation of the motor as a function of the configuration parameter, but if the value of the first signal during the present run is less than the stored value of the first signal, continue the present run.

4. The method of claim 1 wherein the rated load of the material handling system is applied during the commissioning run.

5. The method of claim 4 wherein the known load is the rated load, the first speed is zero speed, and the second speed is rated speed.

6. The method of claim 5 wherein the commissioning run further comprises the steps of:
accelerating the motor from zero speed to rated speed in a second direction of rotation, the second direction opposite to the first direction; and
storing the values of the first signal at a plurality of speeds of the motor as the motor accelerate between zero speed and rated speed.

7. The method of claim 1 wherein the first signal corresponds to the magnitude of the current supplied from the motor drive to the motor.

8. The method of claim 1 wherein the first signal corresponds to the magnitude of the torque generated by the motor.

9. The method of claim 1 wherein the second signal is one of a speed reference signal and an internally generated speed feedback signal.

10. The method of claim 1 wherein a position feedback device is connected to the motor and configured to generate a speed feedback signal corresponding to the rotation of the motor and wherein the second signal is generated from the speed feedback signal.

11. A motor drive configured to control a hoisting motor in a material handling system, the motor drive comprising:
a plurality of power terminals configured to receive one of alternating current (AC) or direct current (DC) input power from an external power source;
a power conversion section configured to transfer the input power to output power to the hoisting motor, wherein the output power includes at least one of a controlled current and a controlled voltage;
at least one input terminal configured to receive a command signal corresponding to a desired speed of the motor;
at least one current sensor configured to generate a signal corresponding to an amplitude of the current output to the motor;
a memory device configured to store a plurality of instructions and a plurality of parameters; and
a processor configured to execute the plurality of instructions to:
determine the value of a signal corresponding to a load present on the motor as a function of the amplitude of the current output to the motor;
during a commissioning run:
accelerate the hoisting motor from a first speed to a second speed in a first direction of rotation with a known load suspended from the material handling system, wherein the second speed is greater than the first speed, and
generate a table including a plurality of values of the signal corresponding to the known load present on the motor at a plurality of speeds of the motor as the motor accelerates between the first speed and the second speed;
store the table in the memory device; and
during subsequent runs, compare the value of the load present on the motor to a stored value of the load at a speed corresponding to the present speed of the motor.

12. The motor drive of claim 11 further comprising a display configured to provide a visual indication of the magnitude of the load to an operator of the motor drive.

13. The motor drive of claim 11 further comprising one of an audio or a visual indicator to provide indication to an operator that a measured load exceeds the rated load of the motor drive.

14. The motor drive of claim 11 wherein the processor is further configured to:
read a configuration parameter from the memory device; and
if the value of the load during the present run is greater than or equal to the stored value of the load, control operation of the motor as a function of the configuration parameter, but if the value of the load during the present run is less than the stored value of the load, continue the present run.

15. The motor drive of claim 11 wherein the table is generated with the rated load of the hoisting motor present.

16. The motor drive of claim 15 wherein the known load is the rated load, the first speed is zero speed, and the second speed is rated speed.

17. The motor drive of claim 16 wherein the processor is further configured to:
accelerate the hoisting motor from zero speed to rated speed in a second direction of rotation, the second direction opposite to the first direction; and
store values of the load determined as a function of the amplitude of the controlled current output to the motor at a plurality of operating speeds between zero speed and rated speed.

18. The motor drive of claim 11 further comprising an input configured to receive a signal from a position sensor operatively mounted on the hoisting motor, the signal corresponding to the angular position of the hoisting motor, wherein the processor is further configured to execute to determine the speed of the motor as a function of the rate of change of the signal from the position sensor.

* * * * *